(12) United States Patent
Krauthäuser

(10) Patent No.: US 11,243,174 B2
(45) Date of Patent: Feb. 8, 2022

(54) ARRANGEMENT AND METHOD FOR CONTACTLESS DETERMINATION OF A DIMENSION OF A MOVING WEB

(71) Applicant: IMS Messsysteme GmbH, Heiligenhaus (DE)

(72) Inventor: Horst Krauthäuser, Heiligenhaus (DE)

(73) Assignee: IMS Messsysteme GmbH, Heiligenhaus (DE)

( * ) Notice: Subject to any disclaimer, the term of this patent is extended or adjusted under 35 U.S.C. 154(b) by 0 days.

(21) Appl. No.: 17/046,512

(22) PCT Filed: Apr. 10, 2019

(86) PCT No.: PCT/EP2019/059044
§ 371 (c)(1),
(2) Date: Oct. 9, 2020

(87) PCT Pub. No.: WO2018/197445
PCT Pub. Date: Oct. 17, 2019

(65) Prior Publication Data
US 2021/0164913 A1 Jun. 3, 2021

(30) Foreign Application Priority Data
Apr. 12, 2018 (DE) ...................... 10 2018 108 696.2

(51) Int. Cl.
*G01N 21/89* (2006.01)
*G01B 11/24* (2006.01)
(Continued)

(52) U.S. Cl.
CPC ..... *G01N 21/8901* (2013.01); *G01B 11/2433* (2013.01); *G01B 21/045* (2013.01);
(Continued)

(58) Field of Classification Search
CPC ......... G01N 2800/347; G01N 33/6893; G01N 2800/52; G01N 33/5088; G01N 1/30;
(Continued)

(56) References Cited

U.S. PATENT DOCUMENTS 5,220,178 A * 6/1993 Dreiling ............. G01N 21/8914
250/559.03
5,315,666 A 5/1994 Norton-Wayne
(Continued)

FOREIGN PATENT DOCUMENTS

CN 101365910 A * 2/2009 ....... G02F 1/133615
CN 2013177806 U 9/2013
(Continued)

*Primary Examiner* — Michael P Stafira
(74) *Attorney, Agent, or Firm* — The Webb Law Firm

(57) ABSTRACT

The invention relates to an arrangement for contactless determination of at least one dimension of a moving material web, in particular a material web of opaque material, with a background illumination, with optical detection means for detecting at least one current contrast image and with evaluation means, wherein the background illumination is arranged opposite the optical detection means, wherein the material web moves in a plane between the at least one optical detection means and the background illumination, and wherein the current contrast image has at least one piece of information about at least one light intensity laterally adjacent to the material web. Furthermore, the present invention concerns a corresponding process. For simplifying and improving the non-contact determination of the dimension, the present invention proposes to provide a shadowing element and to compare the current contrast image with a reference contrast image, wherein the current contrast image represents a shadowing of the background illumination by the material web and by the shadowing element.

10 Claims, 5 Drawing Sheets

(51) Int. Cl.
    *G01B 21/04* (2006.01)
    *G01N 21/86* (2006.01)
(52) U.S. Cl.
    CPC ..... *G01N 21/86* (2013.01); *G01N 2021/8636* (2013.01); *G01N 2021/8908* (2013.01)
(58) Field of Classification Search
    CPC ..... G01N 2333/70557; G01N 33/5044; G01N 33/57488; G01N 33/57492; G01N 33/6854; G01N 33/6869; G01N 33/6872; G01N 15/0211; G01N 15/0227; G01N 15/0826; G01N 1/28; G01N 1/36; G01N 1/38; G01N 2015/0046; G01N 2015/0222; G01N 2015/084; G01N 2035/00346; G01N 2035/00554; G01N 2035/0437; G01N 2035/1076; G01N 21/0332; G01N 21/253; G01N 21/255; G01N 21/31; G01N 21/4738; G01N 21/51; G01N 21/57; G01N 21/59; G01N 21/75; G01N 21/76; G01N 2201/0642; G01N 2223/076; G01N 2223/316; G01N 2223/3301; G01N 2223/3306; G01N 2223/40; G01N 2333/075; G01N 2333/495; G01N 2333/5412; G01N 2333/705; G01N 2333/70596; G01N 2333/96494; G01N 23/04; G01N 23/20; G01N 23/20091; G01N 23/2076; G01N 23/223; G01N 2500/04; G01N 2800/34; G01N 2800/50; G01N 2800/54; G01N 2800/7052; G01N 33/5005; G01N 33/5064; G01N 33/5082; G01N 33/5085; G01N 33/5091; G01N 33/53; G01N 33/54326; G01N 33/54386; G01N 33/564; G01N 33/566; G01N 33/56966; G01N 33/57415; G01N 33/582; G01N 33/68; G01N 35/026; G01N 35/1004; G01N 35/109; G01N 21/89; G01N 21/8901; G01N 21/8903; G01N 21/8851; G01N 2021/8917; G01N 21/8983; G01N 21/896; G01N 21/8915; G01N 29/265; G01N 2021/8861; G01N 21/8806; G01N 2021/8887; G01N 21/93; G01N 2021/8918; G01N 29/225; G01N 33/346; G01N 2021/8867; G01N 2291/0231; G01N 2291/106; G01N 21/274; G01N 21/8922; G01N 21/86; G01N 21/8422; G01N 2291/2638; G01N 21/8921; G01N 29/043; G01N 2021/8909; G01N 21/892; G01N 21/95; G01N 2021/8854; G01N 2291/2694; G01N 27/61; G01N 2021/8908; G01N 21/8914; G01N 2021/891; G01N 29/28; G01N 33/367; G01N 21/898; G01N 21/894; G01N 21/956; G01N 2291/044; G01N 2021/8912; G01N 2021/8927; G01N 2021/9513; G01N 33/36; G01N 29/04; G01N 21/8916; G01N 29/262; G01N 2021/888; G01N 21/8803; G01N 21/952; G01N 33/362; G01N 29/11; G01N 2021/151; G01N 2021/8864; G01N 21/88; G01N 2291/2623; G01N 33/34; G01N 2021/8841; G01N 21/00; G01N 21/35; G01N 21/3563; G01N 21/91; G01N 21/958; G01N 2333/665; G01N 2333/70571; G01N 33/5058; G01N 2021/8663; G01N 21/17; G01N 21/55; G01N 2021/8645; G01N 2201/12; G01N 2203/0278; G01N 29/221; G01N 29/30; G01N 29/4427; G01N 1/00; G01N 2021/8427; G01N 2021/8444; G01N 2021/8822; G01N 2021/8832; G01N 2021/8845; G01N 21/3559; G01N 21/95607; G01N 2291/0234; G01N 29/0645; G01N 29/226; G01N 37/00; G01N 2021/4711; G01N 2021/8627; G01N 21/95692; G01N 2201/06113; G01N 2201/102; G01N 2291/02854; G01N 2291/0422; G01N 2291/2636; G01N 27/80; G01N 27/82; G01N 27/83; G01N 27/902; G01N 33/383; G01N 2021/5992; G01N 2021/8672; G01N 2021/8907; G01N 2021/8965; G01N 21/15; G01N 21/27; G01N 21/359; G01N 21/4795; G01N 2201/0696; G01N 2291/102; G01N 2291/267; G01N 29/07; G01N 29/27; G01N 15/0618; G01N 19/04; G01N 2021/8896; G01N 2030/522; G01N 2030/8881; G01N 21/314; G01N 21/5907; G01N 21/84; G01N 21/8986; G01N 2291/0258; G01N 25/72; G01N 27/205; G01N 29/24; G01N 29/2493; G01N 29/26; G01N 30/22; G01N 30/6026; G01N 30/6039; G01N 30/8658; G01N 35/00; G01N 35/00594; G01N 19/08; G01N 2021/5961; G01N 2021/8838; G01N 2021/889; G01N 2021/933; G01N 2021/936; G01N 2033/0085; G01N 21/9515; G01N 22/00; G01N 2201/0233; G01N 2201/04; G01N 2201/1085; G01N 2201/12753; G01N 2291/0427; G01N 2291/048; G01N 27/904; G01N 27/92; G01N 29/14; G01N 29/223; G01N 29/2412; G01N 33/24; G01N 33/365; G01N 35/00871; G01N 1/2813; G01N 15/147; G01N 15/17; G01N 17/04; G01N 19/02; G01N 19/10; G01N 2001/2886; G01N 2021/8825; G01N 2021/8829; G01N 2021/8835; G01N 2021/8877; G01N 2021/8883; G01N 2021/8902; G01N 2021/8905; G01N 2021/95615; G01N 2033/0081; G01N 2035/00188; G01N 2035/023; G01N 21/01; G01N 21/25; G01N 21/3554; G01N 21/3581; G01N 21/3586; G01N 21/552; G01N 21/9054; G01N 21/94; G01N 22/02; G01N 2201/062; G01N 2201/0621; G01N 2201/0633; G01N 2201/0638; G01N 2201/0826; G01N 2201/101; G01N 2201/104; G01N 2291/0237; G01N 2291/0289; G01N 2291/045; G01N 2291/105; G01N 2291/262; G01N 2291/2632; G01N 2291/265; G01N 2291/2675; G01N 2291/2696; G01N 23/207; G01N 24/082; G01N 27/9013; G01N 29/34; G01N 33/0008; G01N 33/4927; G01N 33/521; G01N 35/00009; G01N 35/00732; G01N 9/36; G01N 15/04; G01N 15/1468; G01N 2001/2893; G01N 2015/086; G01N 2021/0106; G01N 2021/0168; G01N 2021/1734; G01N 2021/1742; G01N 2021/1774; G01N 2021/4735; G01N 2021/4783; G01N 2021/8416; G01N 2021/8438; G01N 2021/8848; G01N 2021/8893; G01N 2021/8911; G01N 2021/8925; G01N 2021/8967; G01N 2033/0088; G01N 2035/00881; G01N 2035/00891; G01N 2035/009; G01N 2035/1048; G01N 21/21; G01N 21/4788; G01N 21/78; G01N 21/9081; G01N 21/9506; G01N 21/954; G01N 21/95623; G01N 21/95684; G01N 22/04; G01N 2201/021; G01N 2203/0023; G01N 2203/006; G01N 2203/0069; G01N 2203/0234; G01N 2203/0282; G01N 2223/079; G01N 2291/023; G01N 2291/02827; G01N 2291/0421; G01N 2291/0423; G01N 2291/0426; G01N 2291/0428; G01N 2291/101; G01N 2291/2634; G01N 2291/2693; G01N 23/044; G01N 23/083; G01N 23/16; G01N 23/2251; G01N 23/2252; G01N 24/085; G01N 25/18; G01N 27/221; G01N 27/84; G01N 27/87; G01N 2800/56; G01N 29/2418; G01N 29/2456; G01N 29/2487; G01N 3/20; G01N 31/22; G01N 33/00; G01N 33/0062; G01N 33/44; G01N 33/46; G01N 33/48; G01N 33/558; G01N 35/00613; G01N 35/1016; G01N 7/00; G01N 9/24; G02B 21/0032; G02B 21/0076; G02B 21/367; G02B 21/002; G02B 21/0048; G02B 21/16; G02B 5/005; G02B 1/11; G02B 21/0036; G02B 21/004; G02B 21/0052; G02B 21/0064; G02B 21/008; G02B 21/06; G02B 21/361; G02B 26/0833; G02B 26/105; G02B 27/0018; G02B 27/0081; G02B 27/0093; G02B 27/283; G02B 27/46; G02B 30/24; G02B 30/26; G02B 30/35; G02B 3/0012; G02B 3/0056; G02B 5/003; G01B 11/0608; G01B 11/255; G01B 11/06; G01B 11/0683; G01B 11/14; G01B 11/24; G01B 11/25; G01B 11/2513; G01B 11/2518; G01B 11/2522; G01B 11/2536; G01B 2210/50; G01B 11/046; G01B 11/0691; G01B 21/16; G01B 9/00; G01B 11/026; G01B 11/2441; G01B 2290/35; G01B 9/02002; G01B 9/0208; G01B 9/02064; G01B 9/02069; G01B 9/02074; G01B 9/02083; G01B 9/02091; G01B 11/30; G01B 11/303; G01B 11/002; G01B 11/02; G01B 11/04; G01B 11/043; G01B 11/0633; G01B 11/16; G01B 11/2509; G01B 11/254; G01B 11/306; G01B 17/02; G01B 2210/44; G01B 7/287; G01B 7/31; G01B 11/022; G01B 11/03; G01B 11/0625; G01B 11/2433; G01B 11/245; G01B 13/22; G01B 21/045; G01B 21/06; G01B 3/566; G01B 5/00; G01B 5/0002; G01B 5/06; G01B 5/245; G01B 5/285; G01B 7/34; G01J 3/0229; G01J 3/14; G01J 1/0407; G01J 1/42; G01J 2003/064; G01J 2003/1208; G01J 2003/1295; G01J 3/02; G01J 3/0208; G01J 3/021; G01J 3/0237; G01J 3/0259; G01J 3/0275; G01J 3/0291; G01J 3/04; G01J 3/06; G01J 3/18; G01J 3/1809; G01J 3/22; G01J 3/26; G01J 3/28; G01J 3/2823; G01J 3/36; G01J 3/40; G01J 3/42; G01J 3/50

See application file for complete search history.

(56)  References Cited

U.S. PATENT DOCUMENTS

| | | | | |
|---|---|---|---|---|
| 6,175,419 | B1 * | 1/2001 | Haque | G01D 5/342 |
| | | | | 250/559.12 |
| 6,570,651 | B1 * | 5/2003 | Haubold | G01N 21/896 |
| | | | | 356/237.1 |
| 6,880,952 | B2 | 4/2005 | Kiraly et al. | |
| 7,573,055 | B2 | 8/2009 | Palatzky et al. | |
| 9,091,662 | B1 * | 7/2015 | Maddock | G01N 21/8806 |
| 2004/0000652 | A1 * | 1/2004 | Guha | G01N 21/8901 |
| | | | | 250/559.45 |
| 2006/0170910 | A1 * | 8/2006 | Almogy | G01N 21/8903 |
| | | | | 356/237.1 |
| 2007/0008538 | A1 * | 1/2007 | Kiraly | G01N 21/896 |
| | | | | 356/430 |
| 2016/0282279 | A1 * | 9/2016 | Ribnick | G01N 21/8983 |
| 2017/0011502 | A1 * | 1/2017 | Kobayashi | G06T 7/41 |
| 2019/0300222 | A1 * | 10/2019 | Iadonisi | B65C 9/40 |

FOREIGN PATENT DOCUMENTS

| | | | |
|---|---|---|---|
| DE | 102006009444 A1 | 9/2007 | |
| EP | 0324561 A2 | 7/1989 | |
| EP | 3002549 A1 | 6/2016 | |
| EP | 3208572 A1 * | 8/2017 | ......... G01N 21/8901 |
| WO | WO-2007003685 A1 * | 1/2007 | ......... G01N 21/8983 |

* cited by examiner

ARRANGEMENT AND METHOD FOR CONTACTLESS DETERMINATION OF A DIMENSION OF A MOVING WEB

CROSS-REFERENCE TO RELATED APPLICATIONS

This application is the United States national phase of International Application No. PCT/EP2019/059044 filed Apr. 10, 2019, and claims priority to German Patent Application No. 10 2018 108 696.2 filed Apr. 12, 2018, the disclosures of which are hereby incorporated by reference in their entirety.

BACKGROUND OF THE INVENTION

Field of the Invention

The present invention relates to an arrangement for contactless determination of at least one dimension of a moving material web, in particular a material web of opaque material, with a backlight, with optical detection means for detecting at least one current contrast image and with evaluation means, wherein the material web moves in a plane between the at least one optical detection means and the background illumination, and wherein the current contrast image has at least one piece of information about at least one light intensity laterally adjacent to the material web. Furthermore, the present invention concerns a corresponding method.

Description of Related Art

In the manufacture of web-shaped products such as flat-rolled strips of steel or non-ferrous metals, width is an important property. It is measured in the production lines during the run in order to control the process or to prove compliance with tolerances.

For this purpose, the spatial positions of the two edges of the material web are usually recorded. The width is calculated from the difference between the respective positions.

The detection of the web edge positions can be contact or non-contact. A first solution for contactless detection is, for example, to detect the inherent radiation of the web when the web is warm, typically above 600° C. Alternatively, non-contact detection can be achieved using electromagnetic or optical sensors, for example.

In optical detection, the web edge positions are detected in a known manner by illuminating one side of the web and by detecting the shadowing of the illumination by the web from the other side of the web. Usually one or more cameras with a single pixel row each, also called line scan cameras, are used, which are set up to detect light/dark transitions. The accuracy of determining the position of the web edge depends primarily on the pixel resolution of the camera. To determine the width of the material web, the pixel positions of the light/dark transitions, which correspond to the position of a web edge, are usually converted into coordinates of a Cartesian system connected to the cameras. For this purpose, a relationship between pixel position and Cartesian coordinates is used, which has been stored during a calibration as function Position [mm]=f(pixel) or as lookup table.

For calibration, a reference contrast image is used that was taken during a production break. The web is removed and a slit diaphragm is positioned at a nominal height. During calibration, the position and dimensions of the slit diaphragm are known in the camera's Cartesian system, so that the relationship pixel position-Cartesian coordinate can be determined.

Such a method allows the width of the web to be determined during a production process in which the web is moved. However, changes in the properties of lead to inaccuracies in the result, making it unreliable.

For example, the position of the cameras can change, so that the distance between the individual cameras changes by a value ΔOffset compared to the distance between the cameras during calibration, which leads to a corresponding measurement error. A measurement error can also result from a change in the angular position of the cameras. Such changes can be caused by temperature changes, such as a change in the ambient temperature (day/night and summer/winter) or a fluctuating thermal radiation of the material web.

Usually the camera is placed at a predetermined distance from the plane in which the material web moves and the focal distance of the camera is adjusted accordingly. In practice, height deviations can occur during the guidance of the material web, so that the distance between the camera plane and the plane of movement of the material web deviates. This leads to a shift of the light/dark transitions on the captured contrast image, which corresponds to the positions of the web edges and is disadvantageous for the determination of the web width.

A height deviation can also be caused, for example, by the fact that the material web is only observed with one camera. If the distance from the web to the camera is small, the web appears to be narrow; if the distance between the web and the camera is large, the web appears to be wider. Thus, a deviation of the distance between the material web and the camera leads to a measurement error. Such a measuring error can be avoided, for example, by arranging the camera vertically above the web edges or by using several cameras in a stereoscopic system. In a stereoscopic system the use of several cameras is necessary. However, changes in the positions of the cameras are problematic, leading to a measurement error that can neither be calculated nor taken into account.

Based on this prior art, the present invention is based on the object of simplifying and improving the contactless determination of the dimension of a moving material web and, in particular, making it more reliable.

SUMMARY OF THE INVENTION

According to a first teaching of the present invention, the above-mentioned object is performed by an arrangement for contactless determination of at least one dimension of a moving material web, in particular a material web of opaque material, with a backlight, with optical detection means for detecting at least one current contrast image and with evaluation means, wherein the material web moves in a plane between the at least one optical detection means and the background illumination, and wherein the current contrast image has at least one piece of information about at least one light intensity laterally adjacent to the material web, characterized by this, that at least one shadowing element partially covering the backlight is arranged between the backlight and the material web, is resolved in that the shadowing element is partially covered by the material web, and that the evaluation means compare the current contrast image with a reference contrast image, wherein the current contrast image represents a shadowing of the background illumination by the material web and by the shadowing element.

Such an arrangement enables the positions of the web edges and the shadowing element to be detected simultaneously, so that a measuring error caused by changes in the detection means can be detected and taken into account when calculating the web width. Such an arrangement thus makes it possible to determine the actual web width in a simple, accurate and reliable way during production.

The arrangement according to the invention serves for the contactless determination of at least one dimension of a moving material web, in particular a material web of opaque material. Such a material web can, for example, be taken from a production line to be rolled up into a roll so that the material web moves continuously and is tensioned between the production line and the roll. It is also possible to imagine a material web that runs between two devices of a production system.

The material web can be a web of metal, for example in the form of a metal foil, of paper, of plastic, of an opaque fabric, of a composite material or of a multi-layer material. The material web is preferably flat and has a long length compared to its width. The dimension of the material web to be determined is then preferably one width. In addition, the material web has an upper side and a lower side. The lateral edges of the material web are called web edges in the following.

The backlight can have one or more light sources. If several light sources are provided, they preferably have similar luminous properties and are arranged in a row or in a surface. The backlight can have a diffuser to homogenize the luminosity of one or more lamps. The diffuser can be, for example, an opaque plastic workpiece or a frosted glass workpiece. The backlight is preferably located at the bottom side of the material web.

The optical acquisition means are set up to acquire at least one current contrast image. The optical detection means can have one or more cameras, each with a detection area.

Such a camera preferably has a sensor with a plurality of pixels, wherein the pixels are arranged in rows as an area. Accordingly, the camera concerned has a detection area in the form of a strip or an area. Each pixel is defined with a pixel position and is aligned to detect light intensity. In the context of the present invention, an area camera is preferably used as sensor. Thus, a movement of the sensor, which could falsify the result of detection, can be detected easily and quickly.

Such a camera can be a black-and-white camera, which reproduces a light intensity in the form of a gray scale. The camera can also be a color camera, which not only generates information about a light intensity, but also a color.

If the detection devices have several cameras, they are preferably arranged in one plane. Together, the cameras have a total detection range, which results from the respective detection ranges of the individual cameras. In the following, the distribution of light intensity over a detection area is referred to as light intensity distribution.

The term current contrast image means the result of a detection of a current light intensity distribution by the detection means. A current contrast image thus contains information about light intensities, with each light intensity being assigned a pixel position. Several current contrast images can, for example, be arranged one after the other in a film. A time stamp can be assigned to each current contrast image.

The arrangement has evaluation means. This is preferably a computer unit with a processor and a data memory on which program sets and computer algorithms can be stored and executed. In addition, the evaluation means are preferably connected to the acquisition means via a communication link, for example via a cable connection. Alternatively, the communication connection can be wireless.

The material web moves in a plane between the at least one optical detection means and the backlight. Thus, the web overlaps the backlight and, from the perspective of the detection means, the backlight is shaded by the web.

The current contrast image has at least one piece of information about at least one light intensity at the side of the material web. This is in particular by extending the detection range of a detection means or the entire detection range beyond the web edges.

The shadowing element is preferably made of an opaque material and has dimensions that are known. In addition, the material of the shadowing element can be as temperature-independent as possible or have the lowest possible coefficient of thermal expansion so that the shadowing element deforms as little as possible when the temperature changes.

The shadowing element partially covers the backlight and is located between the backlight and the material web. Furthermore, the shadowing element is at least partially covered by the material web and at least partially not covered by the material web. Accordingly, the light intensity distribution that the detection means detect in a current contrast image is influenced by the position of the web edges and by the shape of the shadowing element.

Furthermore, the acquisition devices are preferably set up to acquire a contrast image with a maximum sharpness at a depth of field. The shadowing element is preferably arranged at a distance from the detection means that is close to the depth of field. This allows the shadowing of the backlight by the shadowing element to be captured with a high sharpness, so that the accuracy can more accurately determine the real dimension of the material web as a whole.

Thus, from the perspective of the detection means, a first area of the backlight is only covered by the web and a second area of the backlight is covered by both the web and the shadowing element. Thus, the width of the web can be determined from the area of the current contrast image, which represents the light intensity distribution in the first area of the backlight. At the same time, from the area of the current contrast image, which represents the light intensity distribution in the second area of the backlight, the shape and the position of the shadowing element can be determined.

The evaluation means are designed to compare the current contrast image with a reference contrast image. A reference contrast image is understood as the result of a reference capture of the light intensity distribution during a production break.

During reference capture, the material web is preferably removed, so that the light intensity distribution during the capture of the reference contrast image corresponds to a shadowing of the background illumination by the shadowing element only. Furthermore, during reference detection, the shadowing element is preferably placed at a nominal height that is to be maintained for the web in a later production process. Therefore, the distance between the detection center plane and the shadowing element is known. The position and dimensions of the shadowing element during reference detection define a reference state. The reference capture is preferably done regularly in larger time intervals of weeks, months or even years.

According to a second teaching of the present invention, the above-mentioned object is solved by a method for contactless determination of at least one dimension of a moving material web, in particular a material web of opaque material and in particular by an arrangement of the type described above, in which a first side of the material web is illuminated, in which a current contrast image is recorded on a second side of the material web, wherein the current contrast image represents a shadowing of the background illumination by the material web and by a shadowing element, in which a current dimension of the material web is determined, in which the current contrast image is compared with a reference contrast image, in which a correction factor is determined depending on the result of the comparison and in which a real dimension of the material web is determined as a function of the current dimension and taking into account the correction factor.

The simultaneous display of the shadowing of the backlight by the web and the shadowing of the backlight by the shadowing element in the same current contrast image allows for the current state of the arrangement to be taken into account when determining a web dimension and/or width. Compared to known methods, it is an advantage that the actual width of the web can be determined reliably.

The comparison between the current contrast image and the reference contrast image may result in a difference in the respective detected shape and position of the shadowing element. From this, a measurement error can be determined and a correction factor can be determined accordingly.

According to the above mentioned method, a current dimension of the material web is determined. The term current dimension is understood as the dimension that can be derived from a current contrast image alone, without comparison with another contrast image and without consideration of a possible change in the arrangement.

To determine such a current dimension, one or more areas of the current contrast image can be selected by the evaluation means. The selected areas correspond to pixel lines of the detection means, which detect the light intensity distribution in a section of the detection area not covered by the shadowing element. The light intensities of the individual pixel positions in the selected areas of the current contrast image are preferably compared with each other by the evaluation means in order to determine the pixel position of possible contrasts or light/dark transitions.

Since in the selected areas of the contrast image the light intensity distribution is only influenced by shadowing of the background illumination by the web, the position of the contrasts corresponds to the position of the web edges. The current dimension can be determined by a relationship between pixel position and Cartesian coordinates stored in the evaluation means.

Furthermore, the current contrast image is compared with a reference contrast image. The current contrast image and the reference contrast image both reflect a light intensity distribution that is influenced by the shadowing element. However, the reference contrast image, the current contrast image was generated in a current contrast image, possibly by temperature change or other changes in the arrangement.

By comparing the current contrast image with the reference contrast image in selected areas where the light intensity distribution was influenced by the shadowing element, it can be determined to what extent the arrangement may have changed. From this, a correction factor can be determined. The correction factor can describe, for example, an offset of the cameras among each other or a rotation of the cameras in comparison to the material web plane.

Then this correction factor is taken into account to determine the real dimension of the material web depending on the current dimension. This is preferably done by executing a computer program on the computer unit of the evaluation means. The result, i.e. the real dimension or width, corresponds to the actual width of the material web at the time the current contrast image was generated.

In the following, various forms of execution of the arrangement and the methods are described, whereby the individual forms of execution applying each case for the arrangement and for the procedure. In addition, the individual forms of execution can be combined with each other.

In a first version of the arrangement, the evaluation means are set up to determine a dimension of the material web and the shape of the shadowing element simultaneously based on the current contrast image. Thus the actual state of the arrangement can be taken into account when determining the real dimension of the material width. In addition, each time a current contrast image is captured, information about the temporally corresponding state of the arrangement can be obtained.

Such determination can be performed, for example, by simultaneously selecting multiple pixel rows of the one current contrast image, each pixel row representing the light intensity distribution in the portion of the detection zone affected by the shadowing element and in the portion of the detection zone not affected by the shadowing element. The selection of the individual selected pixel rows and/or their pixel position can be performed automatically by the evaluation means. Thus, even incase of a possible change of the arrangement, the dimensions of the material web and the shape of the shadowing element can still be determined.

A variety of shapes can be imagined for the shadowing element. However, the shadowing element is preferably designed essentially flat. In addition, individual or side-by-side slots, penetrating holes or the like can be provided at the edge or in the inner area of the shadowing element.

In another design of the arrangement, the at least one shadowing element is designed as a slotted diaphragm, preferably with at least two slots. Slit diaphragms are easy to produce, so that such a shadowing element allows a simple and cost-effective design of the arrangement.

Preferably the shadowing element has one or more slots. If, for example, a single slit is provided, the width of the slit is preferably known in order to determine, on the one hand, the relationship between a pixel position and a corresponding position in the Cartesian coordinate system and, on the other hand, to be able to detect a possible change in the arrangement.

If several slits are provided, they can be arranged next to each other with a known distance between them at the edge of the shadowing element. Thus several contrasts can be detected on a correspondingly captured current contrast image and thus the accuracy of determining the correction factor, i.e. finally the real dimension, can be increased.

Furthermore, the slits can be arranged at uneven intervals. This makes it easier to recognize the individual slits on the current contrast image, so that mix-ups avoided. Thus, changes in the arrangement can be detected more easily and reliably.

In another design of the arrangement, two shadowing elements are arranged in one plane between the backlight and the material web, with the two shadowing elements being spaced apart from each other. This results in an area where the backlight is not covered by any shadowing element but only by the material web. This area allows, as in the case of using a single shadowing element, to detect a contrast transition at the edge of the web. Thus, the determination of the position of the web edges is still possible.

Such an arrangement of two shadowing elements can increase the number of light/dark transitions visible on the current contrast image, thus improving the accuracy and reliability of the correction for determining the real dimension.

A further advantage of such an arrangement is the increase of the interference resistance, for example when there is contamination. If, for example, individual slits are covered by dirt, the measurement can be continued undisturbed by means of the other slits.

In another version of the arrangement, at least two optical detection means are provided, whereby the optical detection means are each designed as an area scan camera with at least two pixel rows. Here the detection areas of the area cameras are preferably each located in an area in which the background illumination is covered by a shadowing element and in an area in which the background illumination is only covered by the material web.

This makes it easy to detect possible movements of the area scan cameras, even if the area scan cameras move independently.

In another version of the arrangement, at least four optical detection means are provided, whereby at least two optical detection means each are designed to simultaneously detect a current contrast image in the area of one web edge of the material web. Thus the position of each web edge can be detected by at least two cameras in a stereoscopic configuration. This allows in particular to detect a possible height shift between the web and the detection means.

In a further version of the arrangement, a plurality of optical detection means are provided, each of which is intended to acquire at least one two-dimensional current contrast image, and the evaluation means are arranged to combine the respective contrast images to form an overall current contrast image.

Here, the recording devices are preferably area cameras. The detection range of the individual area cameras preferably extends over an area in which the background lighting is only covered by the material web and over an area in which the background lighting is covered by a shadowing element. In this way, the number of area cameras can be reduced by down to two.

In addition, a position in the recording center plane can be assigned to each recording means and stored in the data memory of the evaluation means. Thus, the spatial position of the individual cameras can be taken into account when merging the current contrast images captured by the respective cameras. As a result, the entire current contrast image shows information about the light intensity distribution over the entire detection area.

In a first version of the process, the acquisition of the current contrast image, the comparison between the current contrast image and the reference contrast image, and the determination of the web dimension are performed continuously. This allows the temporal development of the real dimensions to be tracked from a series of current contrast images, which is advantageous for quality assurance during web production.

In another version of the process, the real dimensions of the material web are taken into account in a control loop for controlling a production plant. Thus, production parameters that have an influence on the dimension or width of the material web can be changed according to a deviation between the real dimension and a target value for the affected dimension. Thus, a small difference between the real dimension and the target value can be maintained, so that the product quality of the web can be increased.

BRIEF DESCRIPTION OF THE DRAWINGS

In the following, preferred design examples of the invention are explained in more detail using the attached drawing. Shown in the drawing FIG. 1 an arrangement known from the prior art for contactless determination of at least one dimension of a moving material web in a side view, FIG. 2 a further arrangement known from the prior art for contactless determination of at least one dimension of a moving material web in a side view, FIG. 3 a first design example of an arrangement according to the invention for the contactless determination of at least one dimension of a moving material web in a side view, FIG. 4a the arrangement of FIG. 3 in a top view, FIG. 4b a current contrast image captured by the arrangement of FIG. 3, FIG. 4c light intensity distributions for two pixel rows of the contrast image of FIG. 4b and FIG. 5 a further example of an arrangement according to the invention for contactless determination of at least one dimension of a moving material web in a top view.

DESCRIPTION OF THE INVENTION

In the following description of the different design examples, components and elements with the same function and the same mode of operation are marked with the same reference signs, even though the components and elements may differ in dimension or form in the different design examples.

Figure 1:
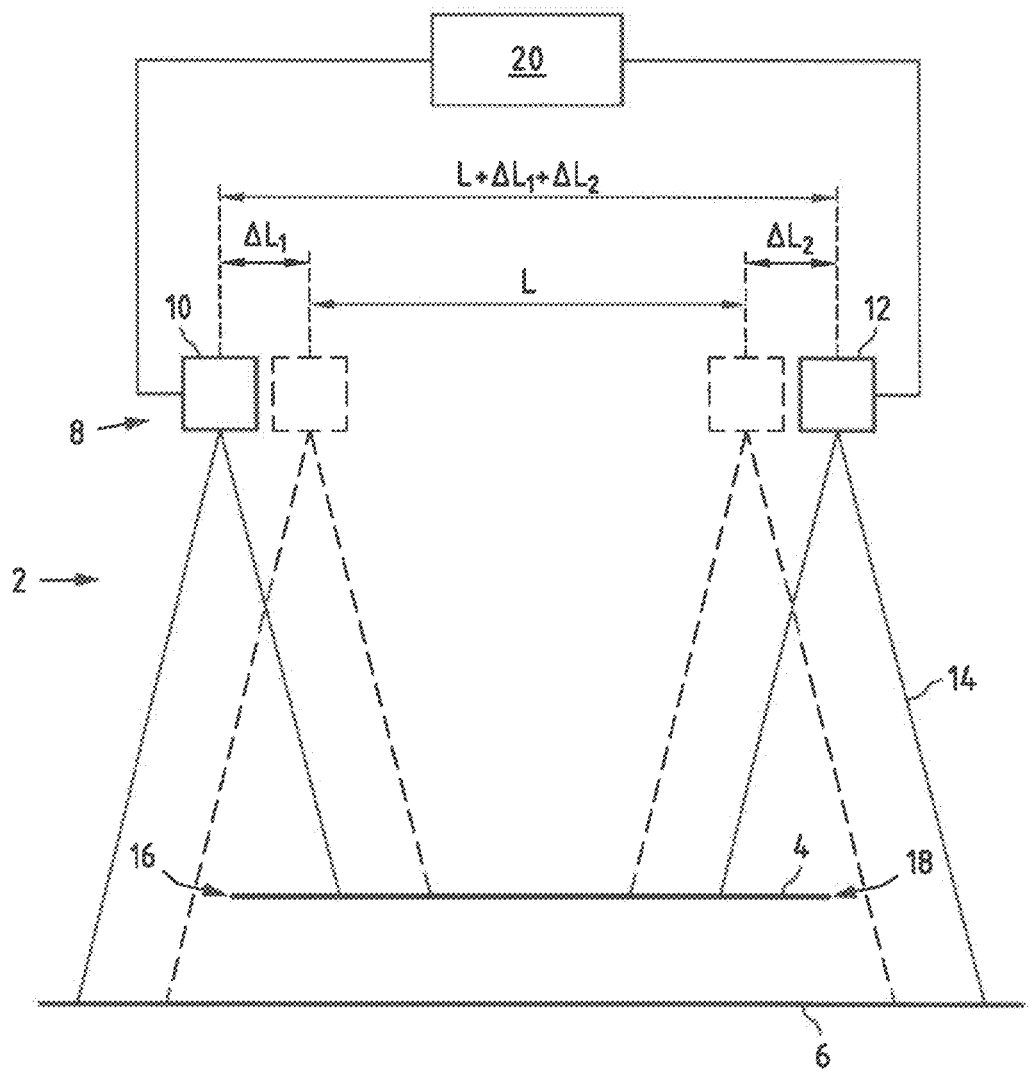

FIG. 1 shows an arrangement known from the prior art for contactless determination of at least one dimension of a moving material web in a side view. The material web 4 is made of metal and moves in a plane perpendicular to FIG. 1.

Arrangement 2 has a backlight 6 and two optical detection means 8 in the form of a first line camera 10 and a second line camera 12. The backlight 6, the material web 4 and the line cameras 10, 12 ideally form three parallel planes, with the plane of the material web 4 being located between the plane of the backlight 6 and the plane of the line cameras 10,12.

Basically, backlight 6, the material web 4 and the line cameras 10, 12 can be arranged with deviations in parallelism to the planes drawn in FIGS. 1 to 5. The description by means of planes serves here for clarity.

The line scan cameras 10, 12 are each set up to capture the light intensity distribution in a strip-shaped detection area 14 and to generate a corresponding current contrast image. Each detection area 14 extends over a section of the web 4 and an edge 16, 18 of the web 4. As a result, two current contrast images are acquired, each containing information about the light intensity distribution in the area of one of the web edges 16, 18.

The line scan cameras 10, 12 are connected to evaluation means 20, which are set up to merge the two acquired current contrast images into one complete current contrast image and to evaluate the complete current contrast image.

In a reference state, the distance between the first line camera 10 and the second line camera 12 equals an amount L. Due to a change in ambient temperature, the first line camera 10 is offset by an offset $\Delta L1$ and the second line camera 12 by an offset $\Delta L2$. This results in a changed state in which the distance between the line scan cameras 10, 12 equals the sum L+FΔL1+ΔL2 Accordingly, the positions of the web edges in the contrast images captured by the respective line scan cameras 10, 12 are shifted by ΔL1 and ΔL2 respectively. Consequently, the total measurement error for determining the width of the web 4 is equal to the sum ΔL1+ΔL2.

Figure 2:
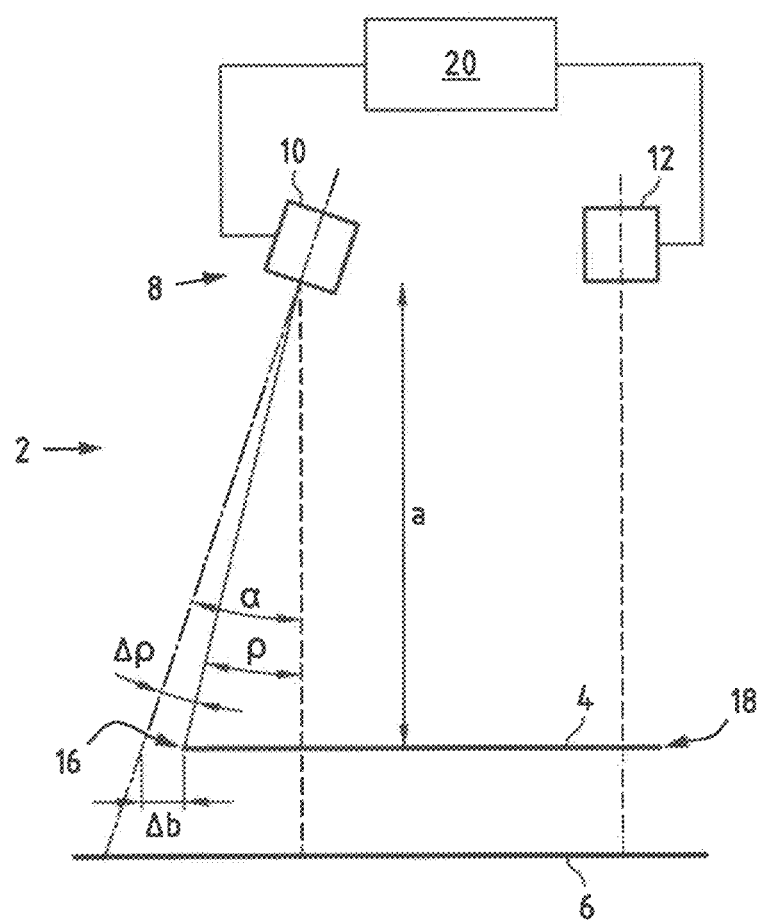

FIG. 2 shows another state-of-the-art arrangement for contactless determination of at least one dimension of a moving material web in a side view. This arrangement 2 differs from the arrangement shown in FIG. 1 in that not the distance between the first line camera 10 and the second line camera 12 has changed, but the angular position of the first line camera 10.

In the reference state, the first line camera 10 is positioned vertically at a distance a from the material web 4. The first line camera 10 detects a shadowing of the background illumination 6 by the web edge 16 with an angle ρ with respect to the vertical. In the changed state the first line camera 10 is shifted by an angle α. Thus, the angle, under which the first line camera 10 captures the shadowing is changed by Δρ. Accordingly, the position of the web edge 16 on the contrast image captured by the first line scan camera 10 is shifted by Δb=a*(tan(ρ+Δρ)−tan(ρ)).

Figure 3:
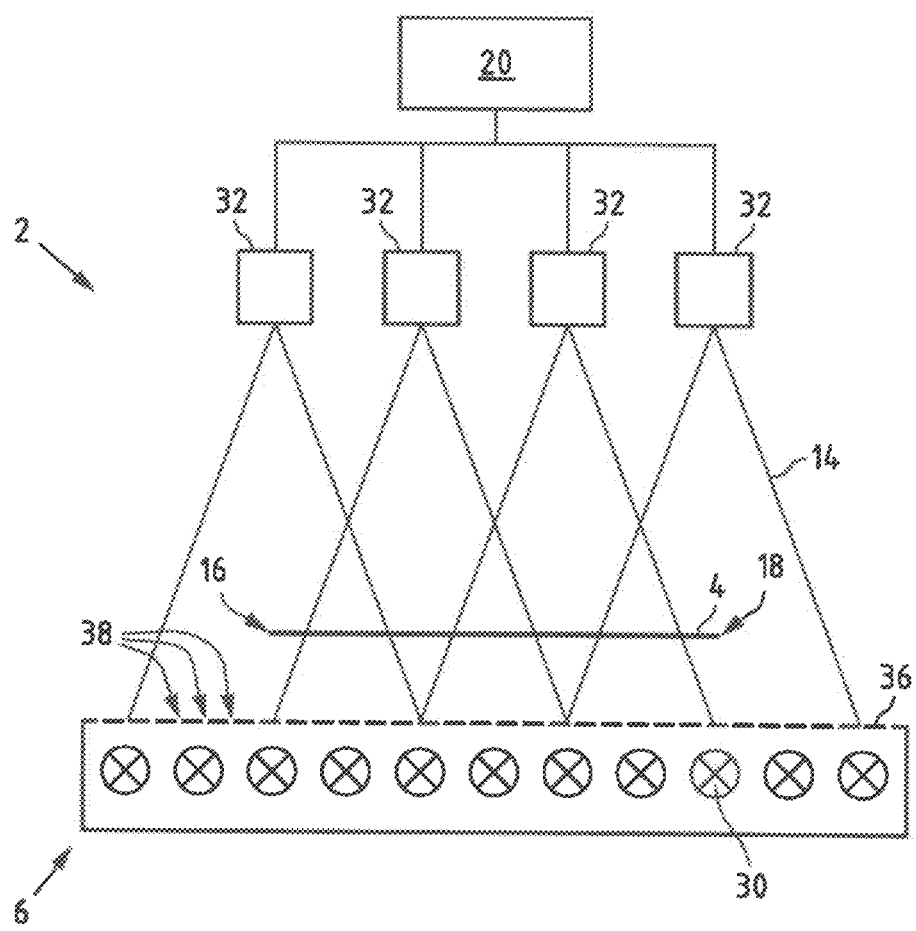

FIG. 3 shows according to the invention a first design of an example of an arrangement 2 for contactless determination of at least one dimension of a moving material web 4 in a side view. The background lighting 6 has a plurality of illuminants 30, which are arranged as parallel as possible to the material web 4. Above the material web 4, four area scan cameras 32 are arranged next to each other. The respective detection areas of the four area scan cameras 32 together form an entire detection area that extends beyond the web edges of the material web 4.

Two of the four area scan cameras 32 are each arranged vertically above a web edge 16 material web 4 and the area scan cameras 32.

A shadowing element 36 in the form of a slit diaphragm with several slits 38 is arranged between the backlight 6 and the material web 4. The slot diaphragm 36 and the material web 4 overlap the backlight, whereby the material web 4 only partially covers the slot diaphragm 36. In addition, the slit diaphragm 36 only partially covers the background lighting 6. The section of the background lighting 6 that is not covered by the slot diaphragm 36 is visible in FIG. 4a.

During operation, the light sources 30 shine in the direction of the area scan cameras 32. The light generated in this way is shaded by the slit diaphragm 36 and the material web 4, so that the current contrast image captured by the area scan cameras 32 reflects a corresponding shadow.

The shadowing element 36 is arranged at a distance from the area scan cameras 32, which is ideally the depth of field of the area scan cameras 32. Thus the area scan cameras 32 capture sharp light/dark transitions caused by the shadowing of the backlight 6 by the shadowing element 36.

Figure 4A:
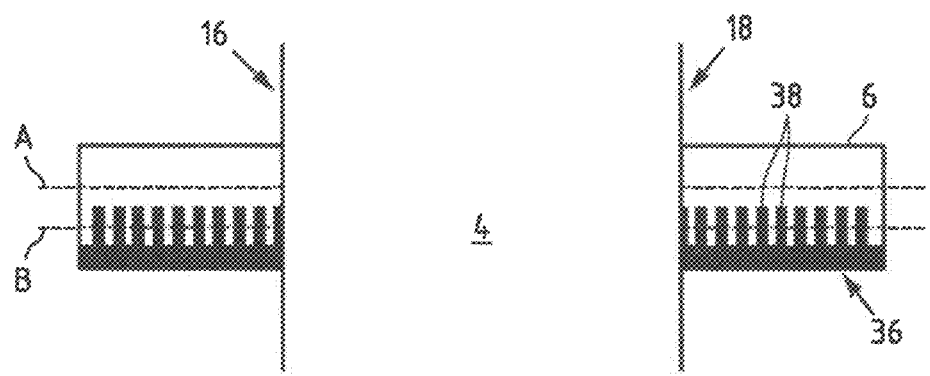

FIG. 4a shows the arrangement 2 of FIG. 3 in a top view from the perspective of the area scan cameras 32. To improve clarity, the area scan cameras 32 are not shown. From this view, the overlap of the material web 4, the slit diaphragm 36 and the background lighting 6 can be seen.

Figure 4B:
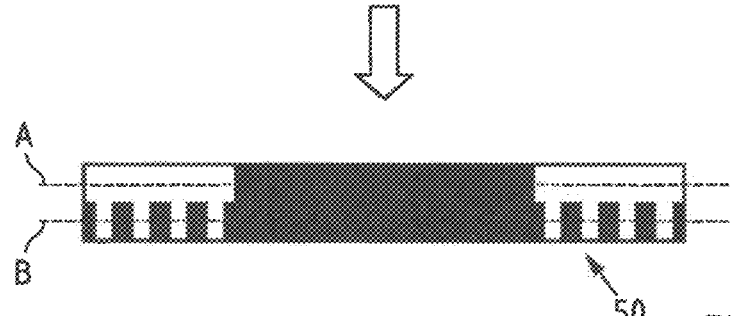

FIG. 4b shows a current contrast image 50 captured by the arrangement 2 of FIG. 3. Various light/dark transitions are visible which, depending on their position on the contrast image 50, correspond to a shadowing of the background illumination 6 by the material web 4 or a shadowing of the background illumination 6 by the slit diaphragm 36.

In the upper half of the contrast image 50, for example, it can be seen that the background illumination 6 is free on the left and covered by the material web 4 on the right. In the lower half of the contrast image 50, the background illumination 6 is shaded by the slit diaphragm 36 on the left and by the material web 4 on the right.

To evaluate the contrast image 50, the evaluation means 20 select two pixel rows: a first pixel row A, which extends in the upper region of the contrast image 50, and a second pixel row B, which extends in the lower region of the contrast image 50.

Figure 4C:
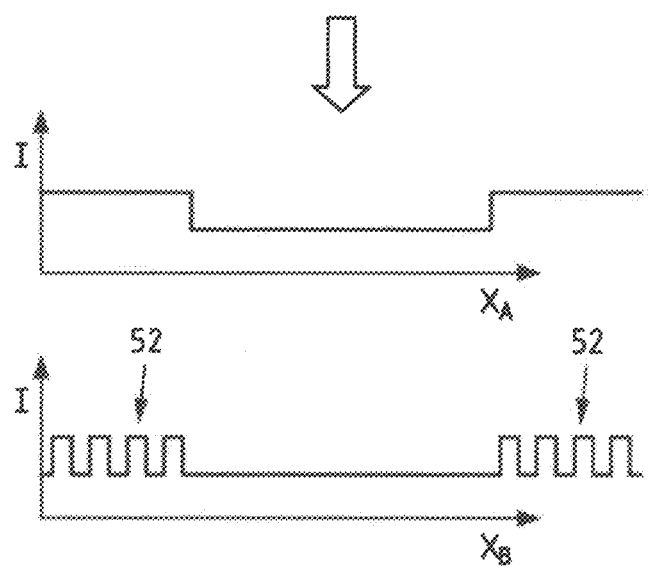

FIG. 4c shows the light intensity distributions for two pixel rows A, B of contrast image 50 of FIG. 4b. The light intensity distributions are shown as distribution of the light intensities I detected by the pixels of the pixel rows A and B as a function of the respective pixel positions $x_A$ and $x_B$ of the pixel rows A, B.

The light intensity distribution for the first pixel row A shows two abrupt light/dark transitions. These transitions each correspond to a web edge 16, 18. Evaluation means 20 determine based on the difference between the pixel positions of both transitions a value for a current width of the web 4.

The light intensity distribution for the second pixel row B shows, from left to right, a sequence 52 of transitions, a section with a constant low light intensity and again a sequence 52 of transitions between high and low light intensity. From the positions of the transitions in sequence 52 the evaluation means 20 determines the positions of the slits 38.

In the evaluation means 20 a reference contrast image is stored, which has been acquired in a reference state of arrangement 2. In addition, 20 computer instructions are stored in the evaluation means 20 to compare the light distribution of the second pixel row B of the contrast image 50 with the light intensity distribution of a corresponding pixel row B in the reference contrast image.

From this comparison, the evaluation means 20 determines whether there are differences between the positions of the slits 38 in the current contrast image 50 and the positions of the slits 38 in the reference contrast image. If there are differences, it is determined which change in arrangement 2 causes these differences and a correction factor is calculated accordingly. If, for example, the position of the slits 38 is shifted, the area scan cameras 32 have shifted and the correction factor is calculated as offset.

Based on the current dimension or width and the correction factor, the evaluation means 20 calculate a real dimension or width. If the correction factor was calculated as offset, the evaluation means 20 add the current dimension and the correction factor together. The result is a real dimension which corresponds to the width of the material web 4 under consideration of the offset of the area cameras 32.

Figure 5:
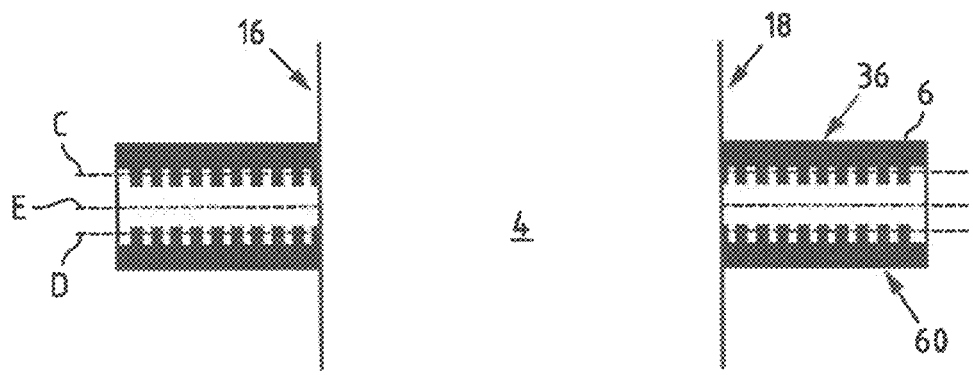

FIG. 5 shows a further example of an arrangement 2 in accordance with the invention for the contactless determination of at least one dimension of a moving material web 4 in a top view. Like the arrangement 2 in FIG. 3, this arrangement 2 has a background illumination 6, detection means 8 in the form of area scan cameras 32 and evaluation means 20. As in FIG. 3, the area scan cameras 32 are not shown to improve clarity.

This arrangement 2 differs from the arrangement in FIG. 3 in that not only one but two shadowing elements 36, 60 are provided. The two shadowing elements 36, 60 are designed as slit diaphragms and rearranged on one level between the background illumination 6 and the material web 4. An area between the two shadowing elements 36, 60 remains free to determine the current dimension.

To evaluate the current contrast image captured by this arrangement 2, three specific pixel rows are selected by the evaluation means 20. A first pixel row C and a second pixel row D each extend over an upper area of the background illumination 6, shaded by a first slit diaphragm 36 and by the material web 4, and over a lower area of the background illumination 6, shaded by a second slit diaphragm 60. A third pixel row E extends over a middle area of the background illumination 6, shaded only by the material web 4.

The area scan cameras 32 are set up to capture a large number of current contrast images with a time interval one after the other. The evaluation means 20 evaluate the successively acquired contrast images parallel to the acquisition, whereby the time interval between the evaluations corresponds to the time interval between the acquisition of the contrast images. The time interval is selected to be as short as possible so that the user can continuously acquire the current contrast image, compare the current contrast image with the reference contrast image and determine the dimension of the material web 4.

Furthermore, the evaluation means 20 are included in a control loop for a production system, so that the specific real dimension of the material web 4 is taken into account in the control of the production system.

The invention claimed is:

1. An arrangement for contactless determination of at least one dimension of a moving material web, in particular a material web of opaque material,
   with a backlight,
   with optical detection means for detecting at least one current contrast image and
   with evaluation means,
   wherein the material web continuously moves in a plane between the at least one optical detection means and the background illumination, and
   wherein the current contrast image has at least one piece of information about at least one light intensity laterally adjacent to the material web,
   wherein at least one shadowing element partially covering the backlight is arranged between the backlight and the material web,
   wherein the shadowing element is partially covered by the material web, and
   wherein the evaluation means compare the current contrast image with a reference contrast image,
   characterized in that the current contrast image represents a shadowing of the background illumination by the material web and by the shadowing element
   wherein the reference contrast image corresponds to a shading of the background illumination only by the shadowing element, and
   in that the evaluation means are set up to determine a correction factor from the comparison and to take this correction factor into account when determining the real dimension of the material web,
   wherein the real dimension corresponds to the actual width of the material web at which the current contrast image was generated.

2. The arrangement according to claim 1,
   characterized by this,
   in that the evaluation means are arranged to determine a dimension of the material web and the shape of the shadowing element simultaneously on the basis of the current contrast image.

3. The arrangement according to claim 1,
   characterized by this,
   in that the at least one shadowing element is designed as a slit diaphragm, preferably with at least two slits.

4. The arrangement according to claim 1,
   characterized by this,
   that two shadowing elements are arranged on one level between the backlight and the material web,
   wherein the two shadowing elements are spaced apart.

5. The arrangement according to claim 1,
   characterized by this,
   that at least two optical detection means are provided,
   wherein the optical detection means are each formed as an area scan camera with at least two pixel rows.

6. The arrangement according to claim 5,
   characterized by this,
   that at least four optical detection means are provided,
   wherein at least two optical detection means each are arranged to simultaneously detect a current contrast image in the region of a web edge of the material web.

7. The arrangement according to claim 1,
   characterized by this,
   in that a plurality of optical detection means are provided each for detecting at least one two-dimensional current contrast image, and
   that the evaluation means merge the respective contrast images into one complete current contrast image.

8. A method for contactless determination of at least one dimension of a continuously moving material web, in particular a material web of opaque,
   in which a first side of the material web is illuminated,
   in which a current contrast image is recorded on a second side of the material web,
   wherein the current contrast image represents a shadowing of the background illumination by the material web and by a shadowing element,
   wherein the reference contrast image corresponds to a shading of the background illumination only by the shadowing element, and
   wherein the current contrast image has at least one piece of information about at least one light intensity laterally adjacent to the material web,
   in which a current dimension of the material web is determined,
   in which the current contrast image is compared with a reference contrast image,
   in which a correction factor is determined depending on the result of the comparison and
   in which a real dimension of the material web is determined as a function of the current dimension and taking into account the correction factor.

9. The method according to claim 8,
   in which the acquisition of the current contrast image, the comparison between the current contrast image and the reference contrast image and the determination of the dimension of the material web are performed continuously.

10. The method according to claim 8,
    in which the real dimension of the material web is taken into account in a control loop for controlling a production plant.

* * * * *

UNITED STATES PATENT AND TRADEMARK OFFICE
CERTIFICATE OF CORRECTION

| | |
|---|---|
| PATENT NO. | : 11,243,174 B2 |
| APPLICATION NO. | : 17/046512 |
| DATED | : February 8, 2022 |
| INVENTOR(S) | : Krauthauser |

It is certified that error appears in the above-identified patent and that said Letters Patent is hereby corrected as shown below:

On the Title Page

Column 1, item (87) PCT Pub. No., Line 1, delete "WO2018/197445" and insert
-- WO2019/197445 --

Signed and Sealed this
Nineteenth Day of April, 2022

Katherine Kelly Vidal
*Director of the United States Patent and Trademark Office*